US012659620B2

(12) United States Patent
Kondoh et al.

(10) Patent No.: US 12,659,620 B2
(45) Date of Patent: Jun. 16, 2026

(54) PHOTOELECTRIC CONVERSION DEVICE, APPARATUS, AND SIGNAL PROCESSING METHOD

(71) Applicant: CANON KABUSHIKI KAISHA, Tokyo (JP)

(72) Inventors: Toshiya Kondoh, Kanagawa (JP); Jumpei Ashida, Cupertino, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/810,277

(22) Filed: Aug. 20, 2024

(65) Prior Publication Data

US 2025/0071443 A1 Feb. 27, 2025

(30) Foreign Application Priority Data

Aug. 23, 2023 (JP) .................................. 2023-135474

(51) Int. Cl.
    *H04N 25/77* (2023.01)
    *H04N 25/50* (2023.01)
    *H04N 25/707* (2023.01)

(52) U.S. Cl.
    CPC ............. *H04N 25/77* (2023.01); *H04N 25/50* (2023.01); *H04N 25/707* (2023.01)

(58) Field of Classification Search
    CPC ...... H04N 5/353; H04N 25/47; H04N 25/133; H04N 25/13; H04N 25/11; H04N 25/707; H04N 25/50; H04N 25/77; H04N 5/3745
    See application file for complete search history.

(56) References Cited

U.S. PATENT DOCUMENTS

| | | | |
|---|---|---|---|
| 2015/0115163 A1 | 4/2015 | Nishihara | |
| 2020/0252534 A1 | 8/2020 | Yasuda | |
| 2021/0051279 A1* | 2/2021 | Tochigi | .................. H04N 25/77 |
| 2022/0201182 A1 | 6/2022 | Maekawa | |

FOREIGN PATENT DOCUMENTS

| | | |
|---|---|---|
| JP | 2020096347 A | 6/2020 |
| JP | 2020123930 A | 8/2020 |
| JP | 2022096472 A | 6/2022 |
| WO | 2013157448 A | 10/2013 |

* cited by examiner

*Primary Examiner* — Xi Wang

(74) *Attorney, Agent, or Firm* — Canon U.S.A., Inc. IP Division

(57) ABSTRACT

A photoelectric conversion device includes a pixel array including at least one pixel region for which an exposure time is set, the at least one pixel region including a plurality of counting pixels each to output a pixel signal corresponding to a counted value of the number of photons incident during a given exposure time, and a control unit to control the exposure time of the pixel array. The at least one pixel region includes a detection unit to detect an event indicating a change in the pixel signals, and a selection unit to select one of the counting pixels included in the at least one pixel region as a first counting pixel connected to the detection unit. In a case where the event is detected, the control unit determines a length of the exposure time of the at least one pixel region.

10 Claims, 13 Drawing Sheets

Grayscale             RGGB             RCCB

FIG.13A
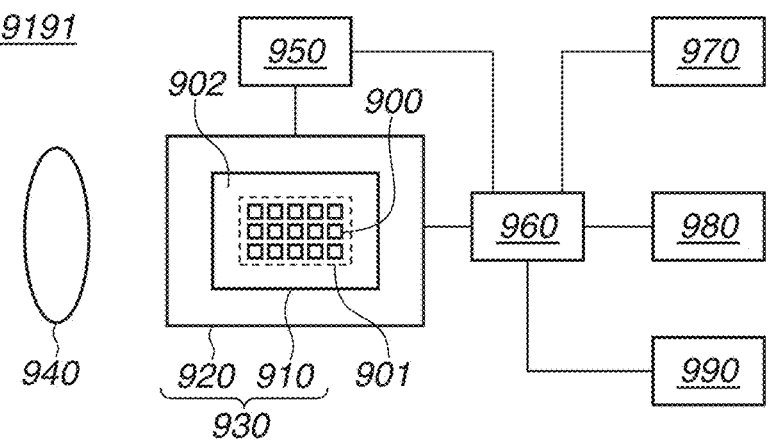
FIG.13B
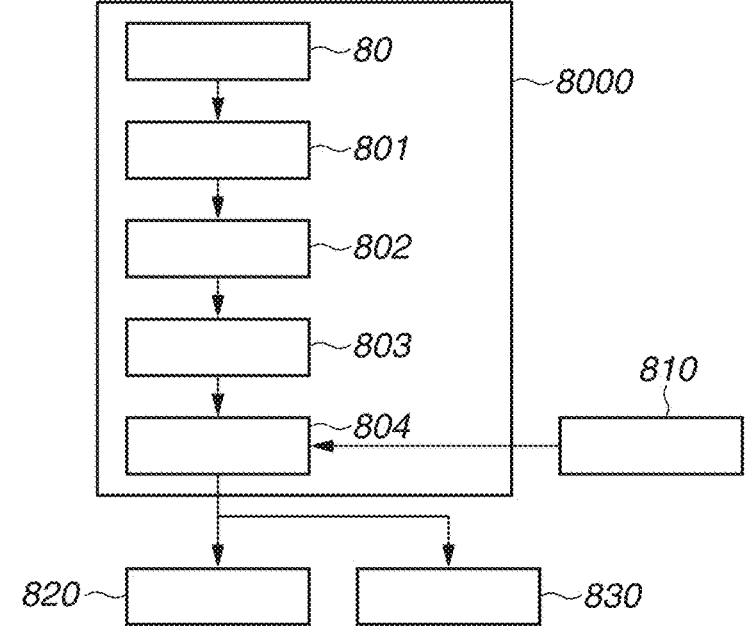
FIG.13C

PHOTOELECTRIC CONVERSION DEVICE, APPARATUS, AND SIGNAL PROCESSING METHOD

BACKGROUND

Technical Field

The aspect of the embodiments relates to a photoelectric conversion device, an apparatus, and a signal processing method.

Description of the Related Art

Along with the popularization of Internet of Things (IoT), artificial intelligence (AI), automated driving in recent years, there is a demand for a high-speed image sensor with less power consumption. An event-based sensor has been proposed that includes a frame pixel for detecting image data in synchronization with a synchronization signal, and a difference (event) detection pixel for outputting data based on a difference value between pixels in asynchronization with the synchronization signal. Japanese Patent Application Laid-Open No. 2020-96347 discusses a method for controlling the exposure time of a frame pixel based on a measurement time after an event detection pixel detects an event in pixel blocks in a two-dimensionally array shape.

In the method discussed in Japanese Patent Application Laid-Open No. 2020-96347, the number of photons of the frame pixel is counted with a detection result signal of the event detection pixel of the pixels in a two-dimensional array shape as a trigger. If the event detection pixel and the frame pixel are pixels having different configurations, it is necessary to manufacture a sensor after the position of the event detection pixel is previously specified. In addition, Japanese Patent Application Laid-Open No. 2020-96347 does not discuss a technique for changing an exposure condition based on an imaging condition. Thus, the controllability of event detection has room for improvement.

SUMMARY

According to an aspect of the embodiments, a conversion device includes a pixel array including at least one pixel region for which a common exposure time is set, the at least one pixel region including a plurality of counting pixels each configured to output a pixel signal corresponding to a counted value of a number of photons incident during a given exposure time, and a control unit configured to control the common exposure time of the pixel array. The at least one pixel region includes at least one detection unit configured to detect an event indicating a change in the pixel signals, and a selection unit configured to select one of the plurality of counting pixels included in the at least one pixel region as at least one first counting pixel connected to the at least one detection unit. In a case where the event is detected, the control unit determines a length of the common exposure time of the at least one pixel region.

Further features of the present invention will become apparent from the following description of exemplary embodiments with reference to the attached drawings.

BRIEF DESCRIPTION OF THE DRAWINGS

FIG. 13A, FIG. 13B, and FIG. 13C are schematic diagrams each illustrating a configuration of an apparatus according to a sixth exemplary embodiment.

DESCRIPTION OF THE EMBODIMENTS

In exemplary embodiments described below, an imaging device is mainly described as an example of a photoelectric conversion device. The exemplary embodiments are not limited to the imaging device, and are applicable to other examples of the photoelectric conversion device. Examples of the photoelectric conversion device include a ranging device (device for distance measurement using focus detection and time of flight (TOF)), and a photometric device (device for measuring the quantity of incident light).

The disclosed contents of the present specification include the complementary sets of the concepts described in the present specification. In other words, for example, even if the present specification contains a description "A is greater than B", it is considered that the present specification also contains a disclosure "A is not greater than B" even if the description "A is not greater than B" is omitted. This is because the description "A is greater than B" is based on the assumption that the case where "A is not greater than B" is considered.

Figure 1:
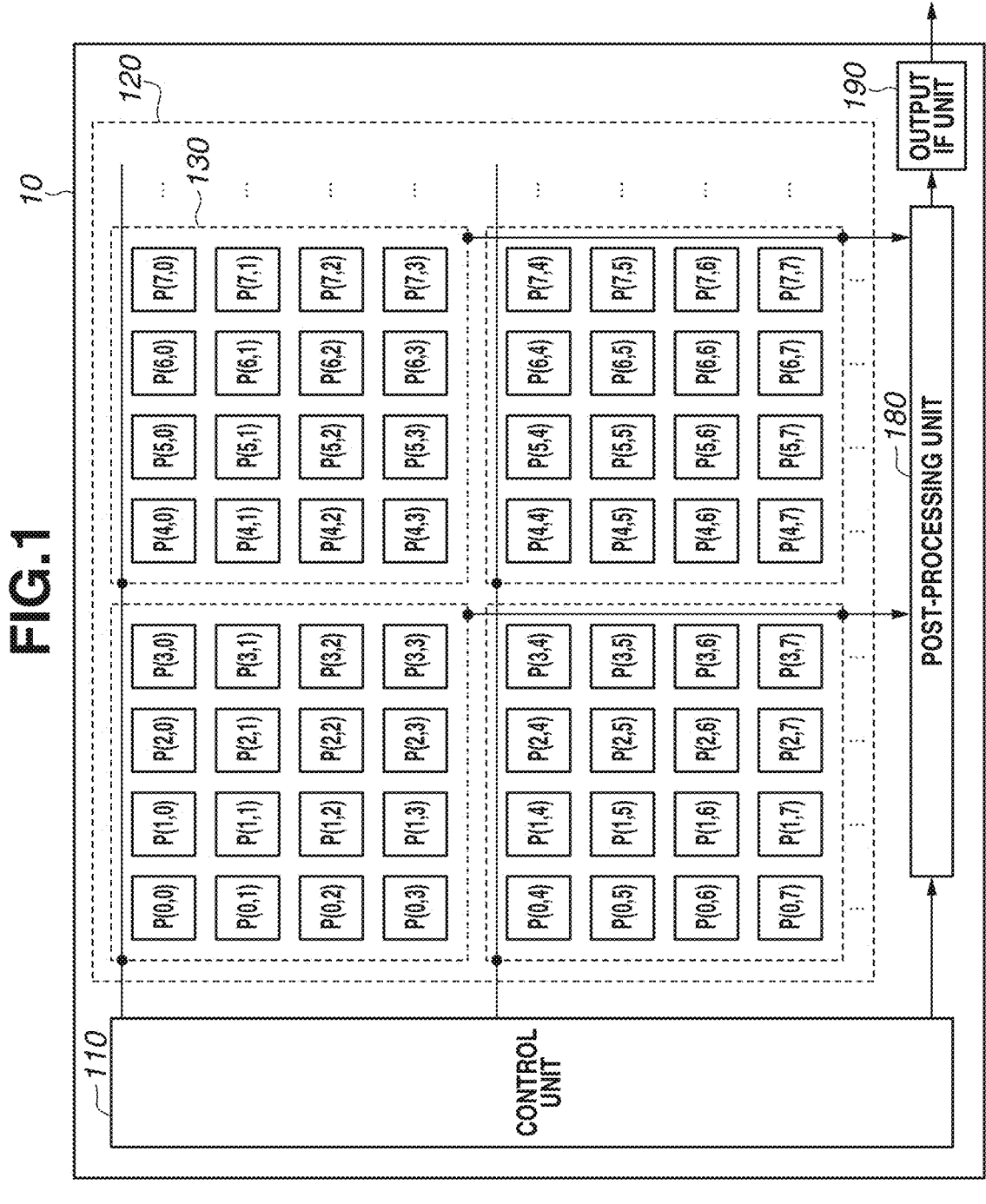
FIG. 1 is a block diagram illustrating an example of a hardware configuration according to a first exemplary embodiment.

A first exemplary embodiment is described. FIG. 1 is a block diagram illustrating a hardware configuration example of the present exemplary embodiment. A photoelectric conversion device 10 includes a control unit 110, a pixel array unit 120, a post-processing unit 180, and an output interface (IF) unit 190.

The pixel array unit 120 includes pixel block portions 130 two-dimensionally arranged. In the following description of the present exemplary embodiment, the pixel array unit 120 includes four pixel block portions 130, but the number of pixel block portions 130 included in the pixel array unit 120 is not limited thereto.

Each pixel block portion 130 is a pixel region where pixels P that are counting pixels each counting the number of photons of light entering during a predetermined exposure time are two-dimensionally arranged. In the present exemplary embodiment, counting is performed during a common exposure time in one pixel block portion 130. In the following description of the present exemplary embodiment, one pixel block portion 130 includes 16 pixels P, but the number of pixels P included in one pixel block portion 130 is not limited thereto.

The post-processing unit 180 performs processing, such as image processing, and detection and recognition processing, in response to an output from the pixel array unit 120. In addition, the post-processing unit 180 outputs a processing result to the control unit 110. The control unit 110 controls the pixel array unit 120 based on the processing result. The output IF unit 190 outputs an output from the post-processing unit 180 to an external device.

Figure 2:
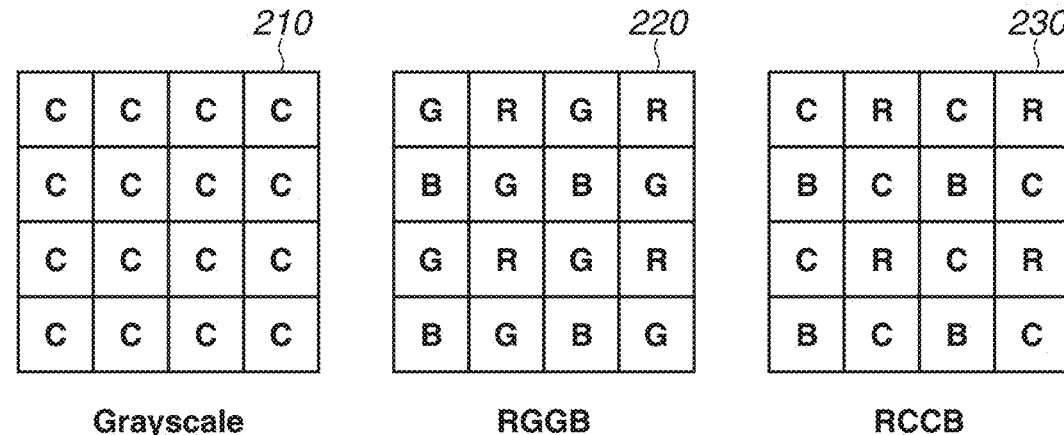
FIG. 2 is a diagram illustrating pixel arrangement examples in a pixel block according to the first exemplary embodiment.

FIG. 2 illustrate arrangement examples of the pixels P in each pixel block portion 130 according to the present exemplary embodiment. FIG. 2 illustrates arrangement examples of 16 pixels. FIG. 2 illustrates a pixel arrangement 210 in a case of grayscale, a pixel arrangement 220 in a case of RGGB, and a pixel arrangement 230 in a case of RCCB. Each of the pixels P includes a counting pixel with a color filter of red (R), green (G), blue (B), or clear (C). However, this is an example in which image output is assumed, and a ranging pixel for measuring the distance to an object may be included in the pixel arrangement. The color filters are not limited to the example, and color filters of complementary colors may be used. In other words, color filters of cyan, magenta, and yellow may be provided in place of the color filters of R, G, and B. In addition, the color filters of R, G, and B and the color filters of the complementary colors may be arranged in combination.

Figure 3:
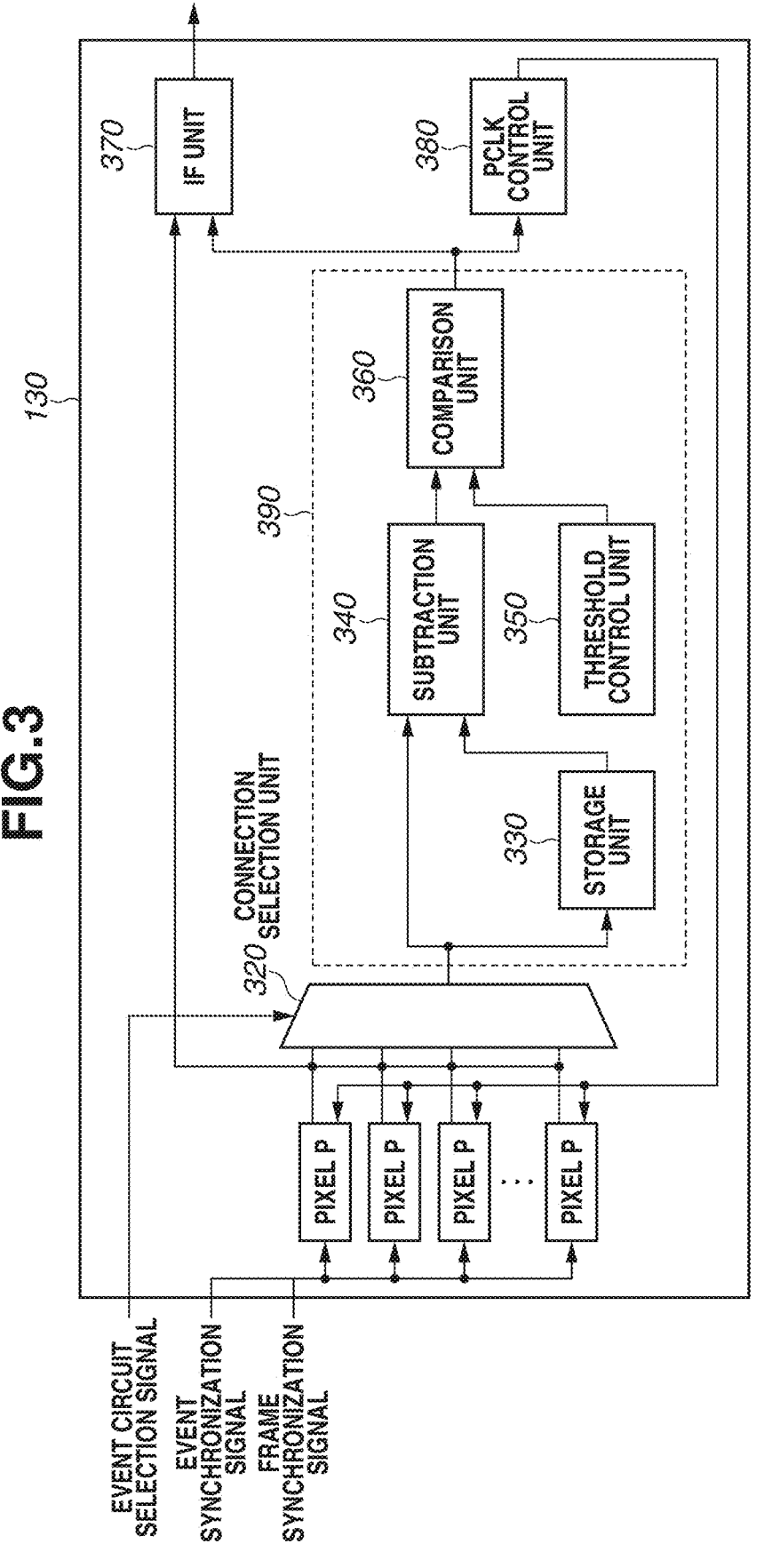
FIG. 3 is a block diagram illustrating an example of a hardware configuration according to the first exemplary embodiment.

FIG. 3 is a block diagram illustrating a hardware configuration example of each pixel block portion according to the first exemplary embodiment. Each pixel block portion 130 includes the plurality of pixels P, and outputs a pixel signal to a subsequent stage in response to an event synchronization signal and a frame synchronization signal from the control unit 110. In the present exemplary embodiment, the number of pixels P included in one pixel block portion 130 is 16, but is not limited thereto.

A connection selection unit 320 connects one of the pixels P of the pixel block portion 130 to a subsequent circuit based on an event circuit selection signal. The pixel P is selected and connected to the subsequent circuit by the connection selection unit 320, functioning as an event detection pixel.

A storage unit 330 stores pixel signals based on light entering the respective pixels P. A subtraction unit 340 derives the difference between two of the plurality of input pixel signals. A threshold is previously set to a threshold control unit 350. A comparison unit 360 compares a value calculated by the subtraction unit 340 and the threshold set to the threshold control unit 350.

The storage unit 330, the subtraction unit 340, the threshold control unit 350, and the comparison unit 360 constitute a detection unit 390. The configuration of the detection unit 390 is not limited to the above-described configuration as long as the detection unit 390 has a function of deriving the presence/absence of an event by comparing a pixel signal in a certain time and a pixel signal in a past time before the certain time.

An IF unit 370 outputs a result of the comparison unit 360 and count information in the 16 pixels P included in the pixel block portion 130 to a subsequent stage. Arrows illustrated as thick lines in FIG. 3 indicate a plurality of signals, and for example, indicate that the count information from the plurality of pixels P is input to the IF unit 370.

A PCLK control unit 380 controls the supply of a signal CLK to each of the pixels P based on the comparison result of the comparison unit 360. The signal CLK output from the PCLK control unit 380 is input to each of the 16 pixels P(x, y) of the pixel block portion 130, and each of the pixels can individually count the number of photons.

The output of the signal CLK from the PCLK control unit 380 to 15 pixels P except for the pixel P(1, 1) set as the event detection pixel out of the 16 pixels P(0, 0) to P(3,3) included in the pixel block portion 130 is previously stopped. If an event is detected with the pixel P(1, 1) set as the event detection pixel, the signal CLK is supplied to the remaining 15 pixels P. In the above description, the pixel set as the event detection pixel is the pixel P(1, 1); however, the event detection pixel can be set to any of the pixels P in the pixel block portion 130 without limitation.

Figure 4:
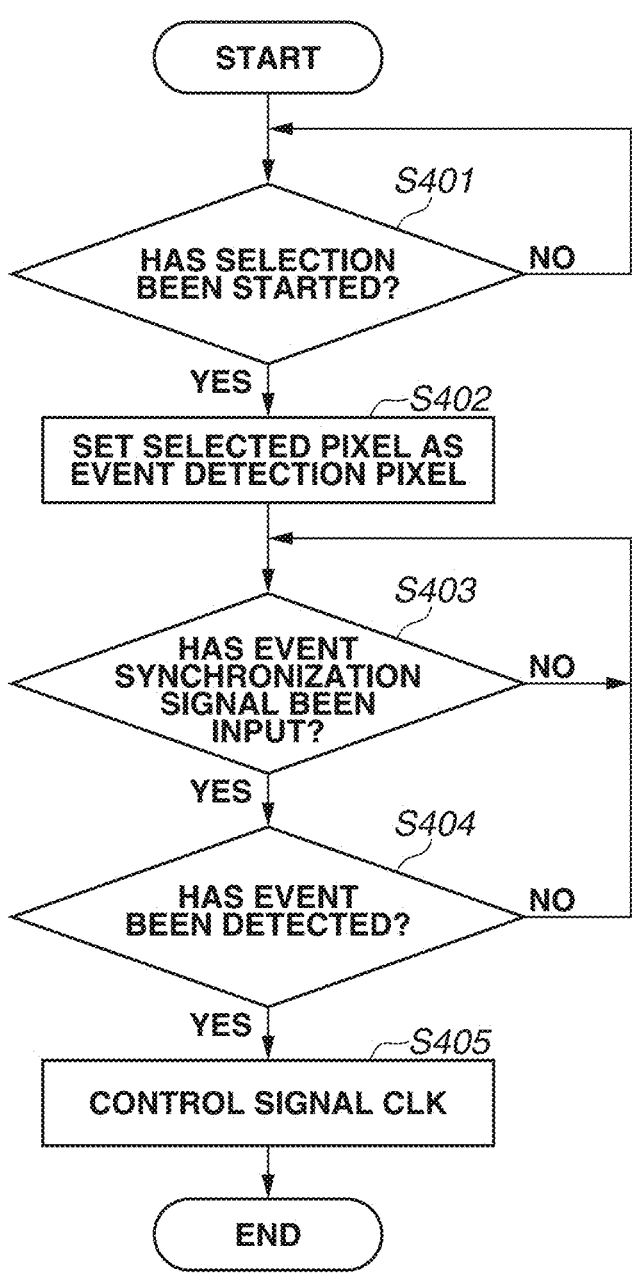
FIG. 4 is a flowchart illustrating the flow of processing according to the first exemplary embodiment.

FIG. 4 is a flowchart illustrating the flow of processing according to the present exemplary embodiment. In step S401, an event circuit selection signal is supplied to the connection selection unit 320, and the connection selection unit 320 selects the pixel P to be connected to the subsequent circuit.

In step S402, the selected pixel P is connected to the subsequent circuit, and is set as the event detection pixel.

In step S403, each of the pixels P determines whether an event synchronization signal has been input from the control unit 110. In step S404, the detection unit 390 determines the presence/absence of a detection of an event from the difference of the pixel signal from a previous frame.

In step S405, the PCLK control unit 380 controls a signal CLK input to the pixel block portion 130 including the pixel P operating as the event detection pixel. The PCLK control unit 380 performs, as the control of the signal CLK, for example, the stop of counting in the pixels P by the stop of the signal CLK, the thinning processing of the signal CLK, and the switching processing of the frequency of the signal CLK. The control of the signal CLK by the PCLK control unit 380 will now be described with reference to FIG. 5A and FIG. 5B.

Figure 5A:
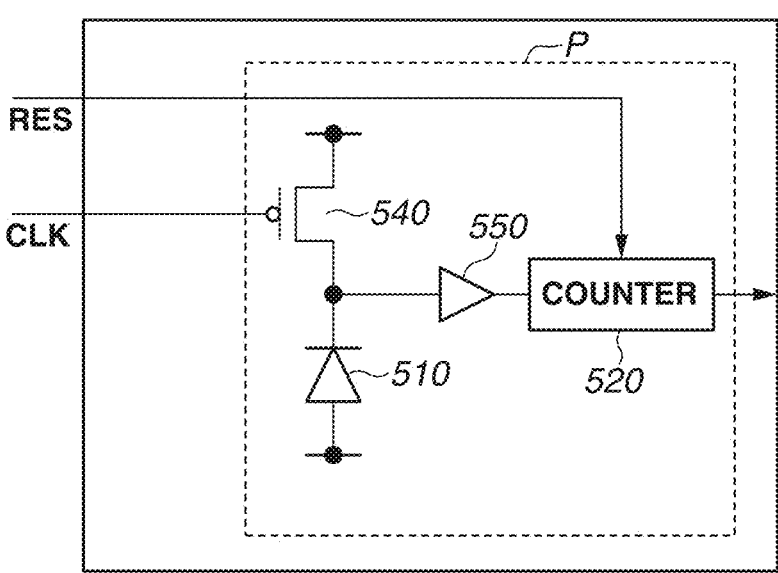
FIG. 5A and FIG. 5B are diagrams each illustrating a configuration example of a photon measurement circuit in a counting pixel according to the first exemplary embodiment.
Figure 5B:
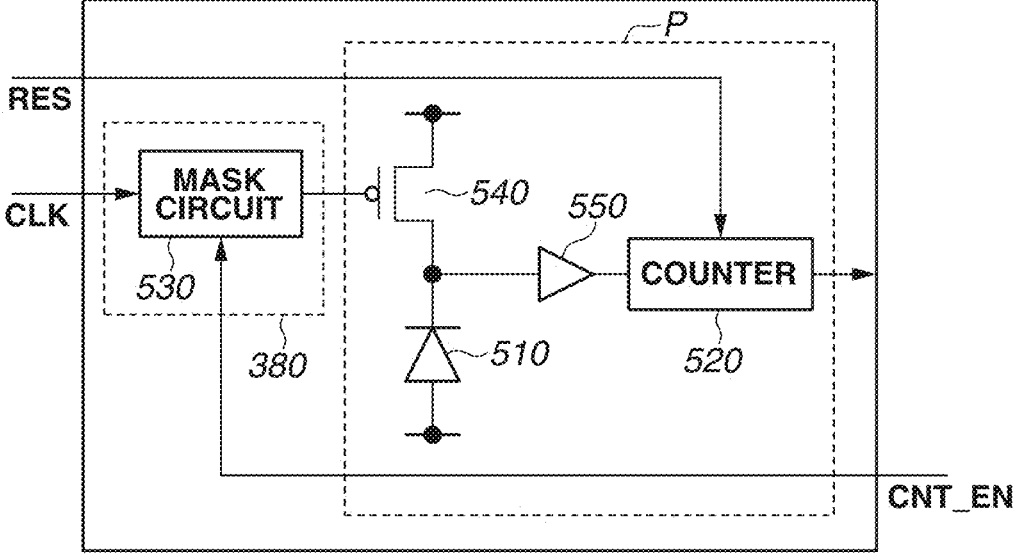

FIG. 5A and FIG. 5B are diagrams each illustrating an example of a photon measurement circuit in a counting pixel. FIG. 5A illustrates a circuit configuration example of a conventional single photon avalanche diode (SPAD) sensor. The SPAD sensor includes an avalanche photodiode (APD) 510 and a counter 520. In the circuit example, the counter 520 counts the number of photons only during the period when a signal CLK is input, and the counter 520 is reset by a signal RES. In other embodiments, in a state where the measurement can be constantly performed maintained with a fixed voltage in place of a signal CLK, only when counting is controlled as with the configuration according to the present exemplary embodiment, the signal CLK for thinning control can be input.

The APD 510 is an avalanche photodiode operating in the Geiger mode.

A quench element 540 is connected to the APD 510, and controls whether to perform a recharge operation for returning the potential of the APD 510 after an avalanche multiplication is performed, to the original potential.

A waveform shaping circuit 550 is an inverter circuit, and shapes a signal output from the APD 510 into a pulse shape and outputs the resultant signal to the counter 520.

The APD 510, the counter 520, the quench element 540, and the waveform shaping circuit 550 can be arranged on a plurality of substrates, which is a stacked sensor. In this case, the APD 510 is provided on a first substrate. The counter 520, the quench element 540, the waveform shaping circuit 550 are provided on a second substrate. The arrangement is merely an example, and more quench elements can be arranged on the first substrate provided with the APD 510. The photoelectric conversion device is not limited to the stacked sensor, and the whole configuration of the photoelectric conversion device according to the present exemplary embodiment can be disposed on one substrate (single layer).

FIG. 5B is a diagram illustrating an example of the photon measurement circuit in the counting pixel according to the present exemplary embodiment.

The circuit illustrated in FIG. 5B includes the PCLK control unit 380 in addition to the configuration illustrated in FIG. 5A. In the PCLK control unit 380, the thinning processing of a signal CLK is performed by a mask circuit 530. The counter 520 counts the number of photons only during the period when a signal CLK is input. In a stacked sensor as the photoelectric conversion device, the mask circuit 530 can be provided on whichever substrate, the second substrate or the first substrate.

In the present exemplary embodiment, the amount of exposure is calculated from the output value of the comparison unit 360, the amount of thinning the signal CLK corresponding to the amount of exposure is derived, and a signal to be set to the mask circuit 530 is generated. In the present exemplary embodiment, the signal CLK is thinned by the mask circuit 530; however, another configuration can be used. For example, the PCLK control unit 380 can select a signal CLK from among a plurality of types of in-phase signal CLKs with different frequencies that are prepared and input the selected CLK to the pixels P, controlling the measurement of the number of photons.

Thinning a signal CLK can be performed with a signal set to the mask circuit 530 that, for example, causes intervals between signal CLKs to be equalized, namely, the frequency of signal CLKs to be reduced.

On the other hands, only while an enable signal to be input to the counter 520 that is additionally provided is activated, the counter 520 can perform counting, substantially thinning a signal CLK. In addition, the PCLK control unit 380 can stop a signal CLK until an event is detected by the detection unit 390, and start the output of the signal CLK in response to a detection of an event by the detection unit 390.

The configuration of the present exemplary embodiment allows any pixel P to be operated as the event detection pixel without a specific event detection pixel. This makes it possible to variably arrange the event detection pixel depending on the operation condition. The event detection pixel can be set while avoiding a defective pixel, if any. Further, this makes it possible to output the value counted by the pixel set as the event detection pixel to a subsequent stage through the IF unit 370, as with the other pixels P not set as the event detection pixel.

In the present exemplary embodiment, the case is assumed where an event circuit selection signal is supplied from the control unit 110; however, the configuration is not limited thereto, and an event circuit selection signal can be a signal based on an event result output from the other pixel block portion 130 through the IF unit 370. For example, an event circuit selection signal based on an event result can be supplied to a pixel block portion adjacent to the pixel block portion 130 including a pixel set as the event detection pixel. As a result, another one or a plurality of pixel block portions

130 each can perform the event detection processing based on an event result of a predetermined pixel block portion 130.

Figure 6:
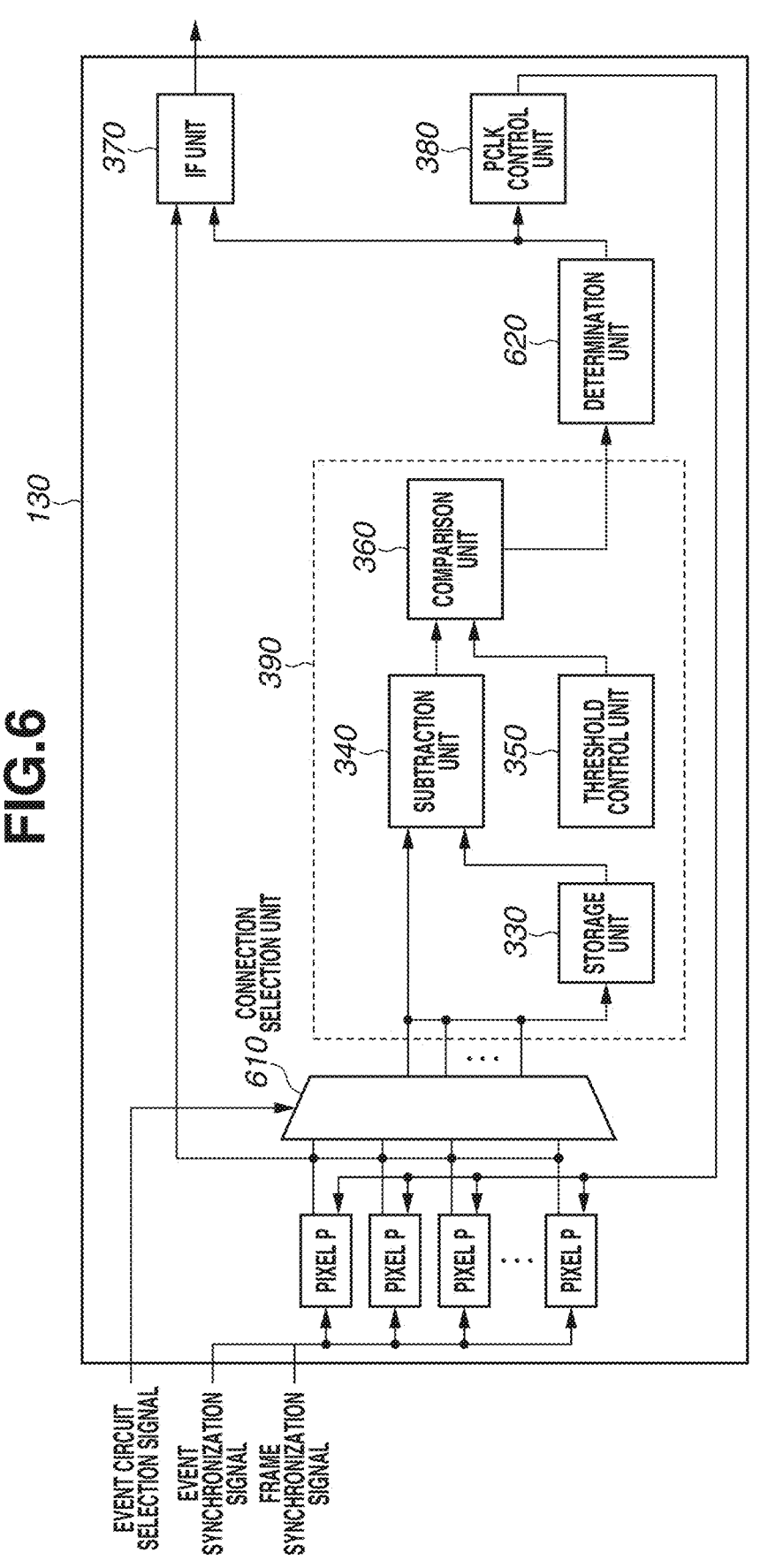
FIG. 6 is a block diagram illustrating an example of a hardware configuration according to a second exemplary embodiment.

A second exemplary embodiment will be described. In the present exemplary embodiment, differences from the first exemplary embodiment will be described. FIG. 6 is a block diagram illustrating a hardware configuration example according to the present exemplary embodiment. In FIG. 6, the connection selection unit is changed to a connection selection unit 610, and a determination unit 620 is added. A plurality of elements as each type of element of the detection unit 390 is included in the detection unit 390. The connection selection unit 610 according to the present exemplary embodiment can select a plurality of pixels P. The portions illustrated with thick lines in FIG. 6 indicate a plurality of elements.

In this configuration, it is assumed that some of the pixels P in the pixel block portion 130 is connected to the subsequent circuit based on an event circuit selection signal. As a result, the number of elements as each type of element of the detection unit 390, namely, the number of the storage units 330, the number of the subtraction units 340, the number of the threshold control units 350, and the number of the comparison units 360 are each equal to the number of pixels P operating as event detection pixels. The pixels P corresponding to the number set with an event circuit selection signal operate as the event detection pixels. The event results output from the plurality of event detection pixels are processed by the determination unit 620.

Figure 7:
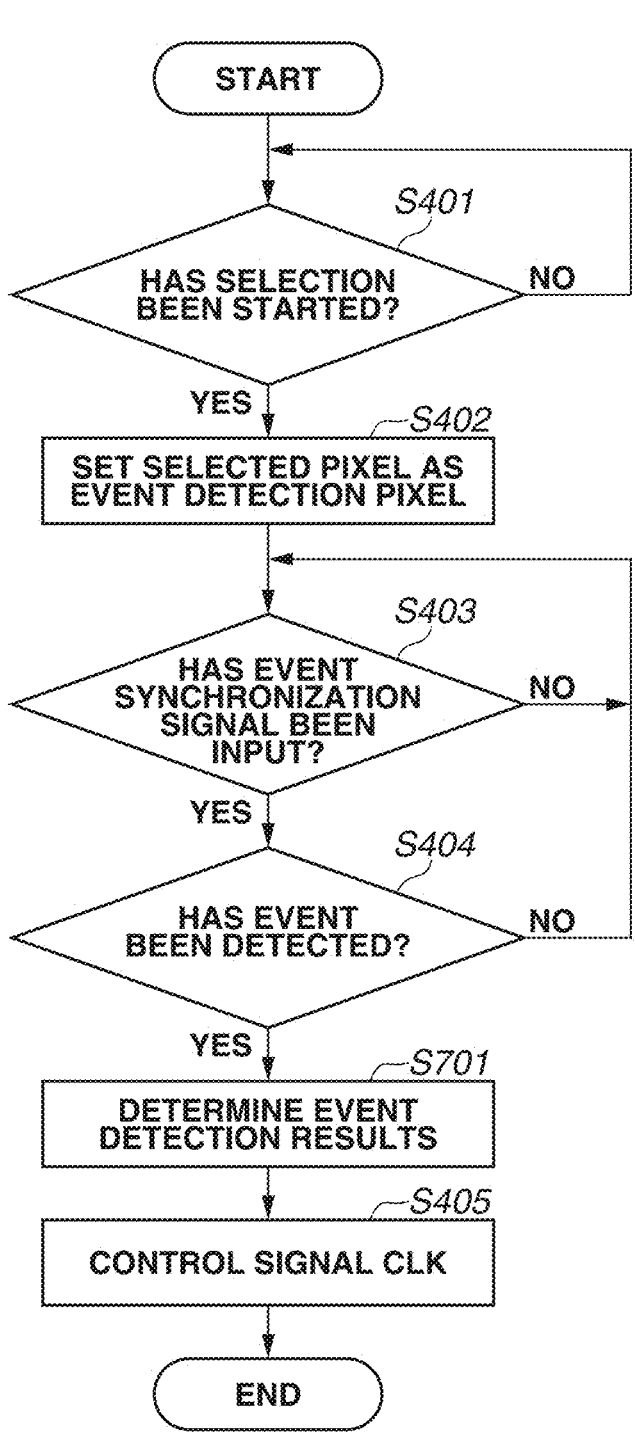
FIG. 7 is a flowchart illustrating the flow of processing according to the second exemplary embodiment.

FIG. 7 is a flowchart illustrating the flow of processing according to the present exemplary embodiment. In the following description, differences from FIG. 4 will be described.

In FIG. 7, the processing in step S701 is added between the processing in step S404 and the processing in step S405. In step S701, the event result determination processing is performed by the determination unit 620, and the plurality of event results input to the determination unit 620 is determined.

For example, if the plurality of event results is multi-valued data, the determination by the determination unit 620 can be performed using an average value, a maximum value, a minimum value, or the like. The determination can be performed by an outside based on a predetermined setting.

In the present exemplary embodiment, the event detection results of the plurality of pixels are used for determination, allowing a high accurate detection even if an event is erroneously detected in a specific pixel.

Figure 8:
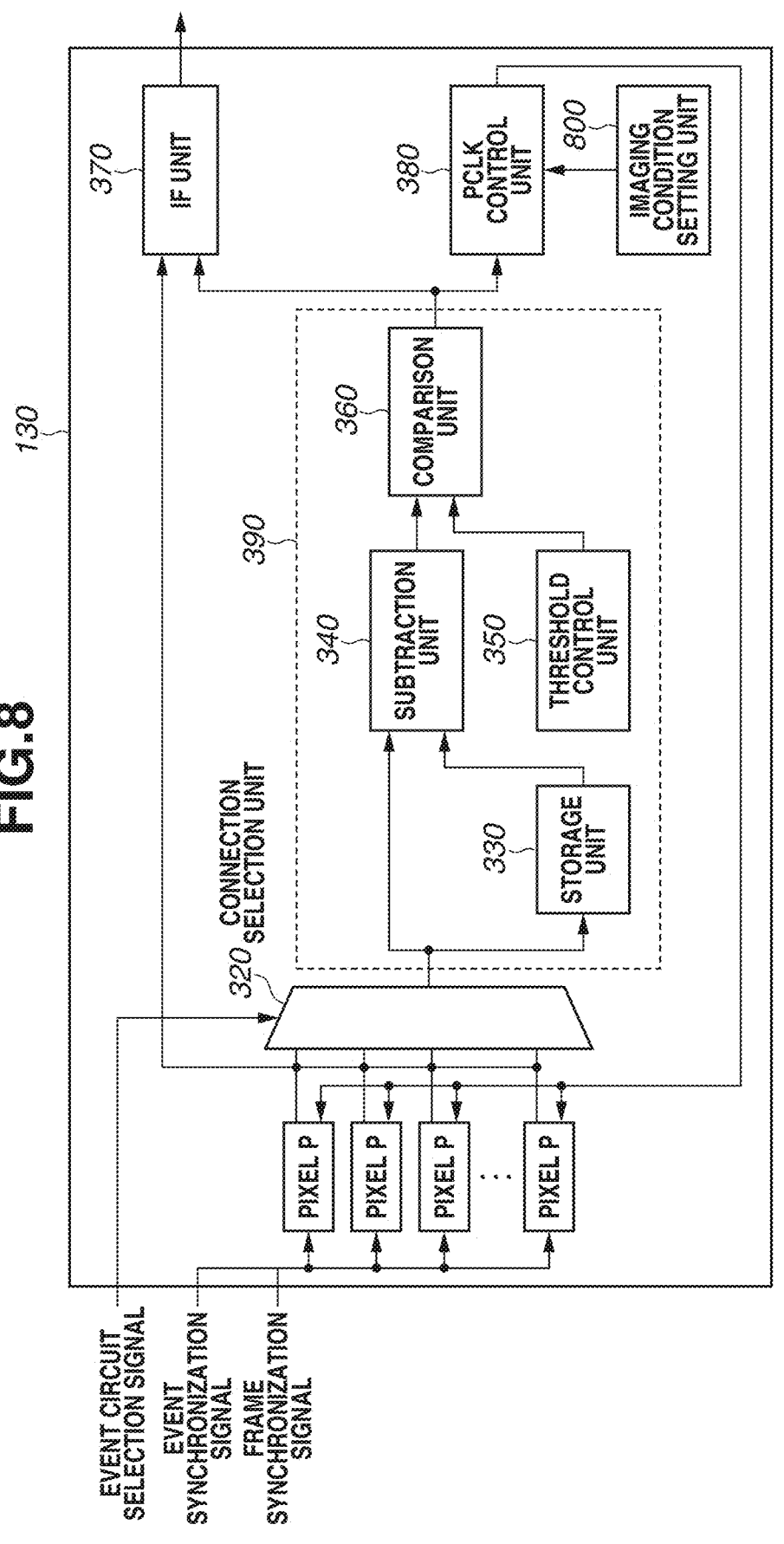
FIG. 8 is a block diagram illustrating an example of a hardware configuration according to a third exemplary embodiment.

A third exemplary embodiment will be described. FIG. 8 is a block diagram illustrating a hardware configuration example according to the present exemplary embodiment. In the present exemplary embodiment, differences from the first exemplary embodiment will be described similarly. In FIG. 8, an imaging condition setting unit 800 is added. In this configuration, the PCLK control unit 380 controls a signal CLK by using output results of the comparison unit 360 and the imaging condition setting unit 800.

Figure 9:
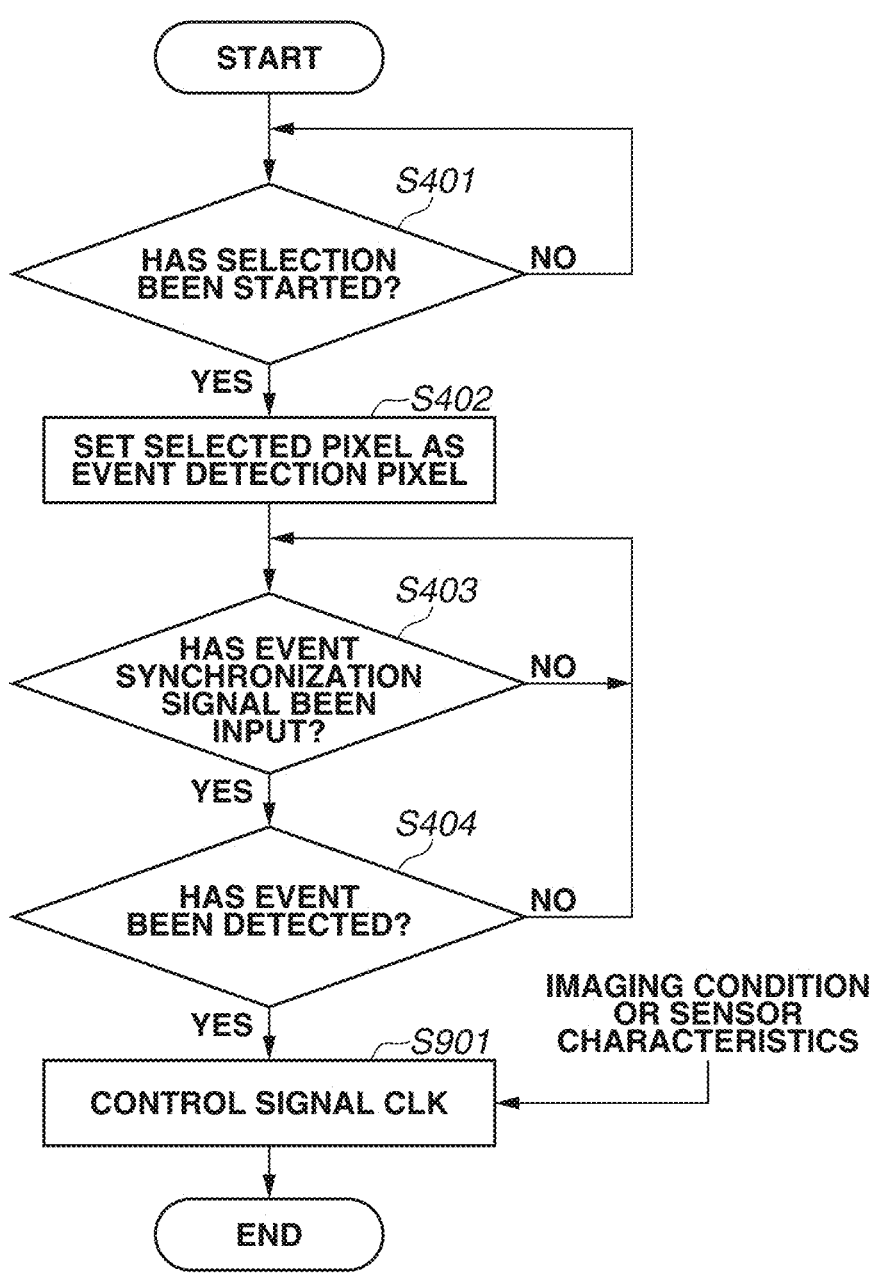
FIG. 9 is a flowchart illustrating the flow of processing according to the third exemplary embodiment.

FIG. 9 is a flowchart illustrating the flow of processing according to the present exemplary embodiment. In the following description, differences from FIG. 4 will be described. In FIG. 9, a difference is the processing in step S901. In step S901, to control a signal CLK, an imaging condition is given as an input signal.

For example, as an imaging condition, the scene where an imaging object largely moves is assumed. In the first exemplary embodiment, the amount of exposure is calculated from an output value of the comparison unit 360, and the amount of thinning a signal CLK corresponding to the amount of exposure is calculated. However, in the scene where an object largely moves as an imaging condition, with the amount of exposure set to the amount of exposure for the scene where an object hardly moves, motion of the object cannot be followed, causing "motion blur" in which the object is blurred in the captured image. In the present exemplary embodiment, for example, in the scene where an object largely moves, the amount of thinning a signal CLK by the PCLK control unit 380 is controlled, and the exposure time is reduced as compared with the scene where an object hardly moves.

As a method of identifying the intensity of motion, for example, an optical flow can be derived from an event detection result in this configuration to identify the intensity of motion. The optical flow is vector information indicating the motion by pixel or region, and is derived based on a change of the occurrence positions of events occurring in a certain region during a certain period. The type of and the amount of the motion are calculated from the optical flow. To calculate the optical flow from an event and to calculate the type and the amount of the motion from the optical flow, well-known algorithms are used.

The method using the optical flow is merely an example, and any other method can be used for identifying the intensity of the motion.

As another scene, the scene where a light-emitting diode (LED) is included as an imaging object is assumed. In recent years, LED flicker has been an issue with an on-vehicle camera. LED flicker is caused by interference between a shutter timing and a turning on-off period of the LED. A LED repeats turning on/off at certain intervals. A LED perceived as being lit at all times by human eyes is viewed like it is off or blinking via a camera, which can cause an erroneous situation determination made by an advanced driver assist system (ADAS) or an automated driving system.

As countermeasures, a method is known of making the shutter releasing time longer than the blinking period of a LED traffic light. In the present exemplary embodiment, in the scene where LED flicker occurs, the amount of thinning a signal CLK by the PCLK control unit 380 is controlled so as to secure a predetermined exposure time by giving the imaging condition as an input signal. For example, in the scene where an LED light source blinking at 100 Hz is imaged, causing LED flicker, the amount of thinning a signal CLK is controlled so as to secure an exposure time of 10 ms (1/100 seconds) or more based on the period of the LED.

In the present exemplary embodiment, an LED is described as an example of a blinking light source; however, a blinking light source is not limited to the example, and the present exemplary embodiment can be applied to any blinking light source. Examples of the blinking light source include a fluorescent lamp.

Figure 10:
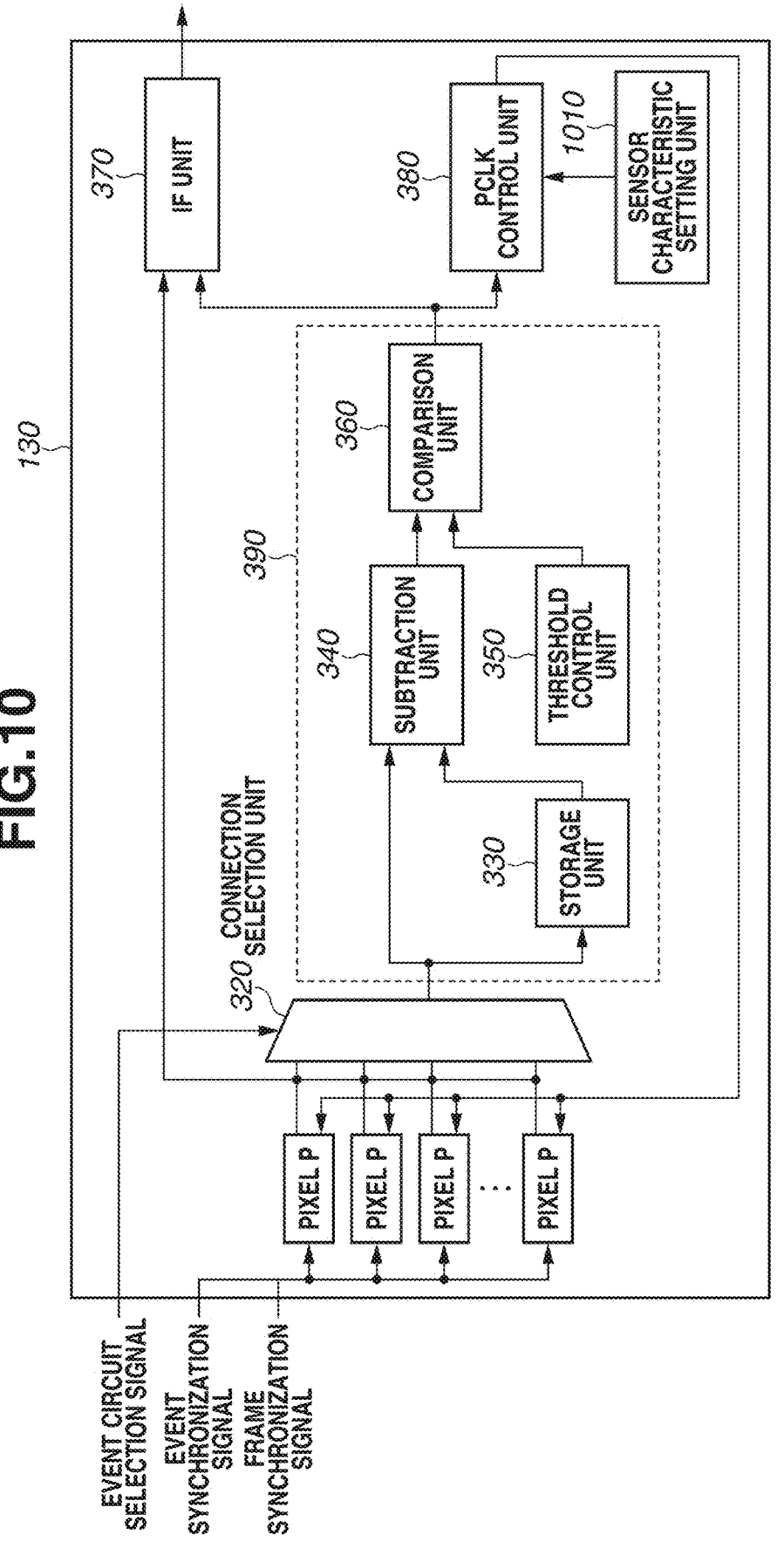
FIG. 10 is a block diagram illustrating an example of a hardware configuration according to a fourth exemplary embodiment.

A fourth exemplary embodiment will be described. FIG. 10 is a block diagram illustrating a hardware configuration example according to the present exemplary embodiment. In the following description, differences from the first exemplary embodiment will be described.

In FIG. 10, a sensor characteristic setting unit 1010 is added. In this configuration, the PCLK control unit 380 controls a signal CLK by using output results of the comparison unit 360 and the sensor characteristic setting unit 1010.

The flow of processing according to the present exemplary embodiment will be described with reference to the flowchart illustrated in FIG. 9. In the present exemplary embodiment, in step S901, to control a signal CLK, a sensor characteristic is given as an input signal.

As the case where a sensor characteristic is given as an input signal, control based on the presence/absence of a defective pixel will be described. In an image sensor, among the arranged pixels, a pixel not normally functioning may occur.

In the present exemplary embodiment, in the control of a signal CLK by the PCLK control unit 380, information on the coordinates where a defective pixel is present is given as the sensor characteristic as the input signal. In a defective pixel, normal counting in the SPAD pixel cannot be performed. Thus, the control to stop a signal CLK is performed by the PCLK control unit 380. Other than the stop of a signal CLK, the frequency of the signal CLK can be changed.

Figure 11:
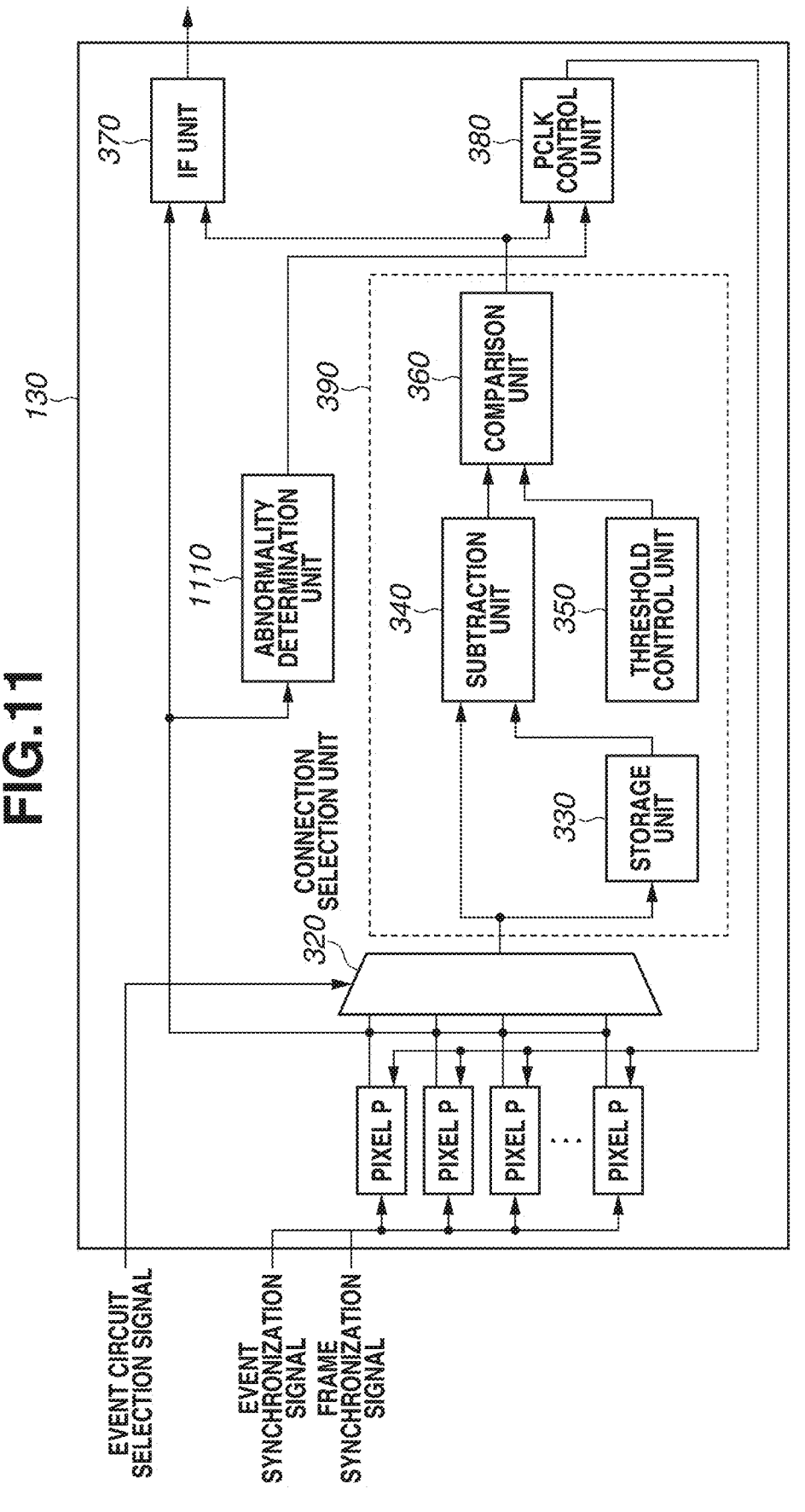
FIG. 11 is a block diagram illustrating an example of a hardware configuration according to a fifth exemplary embodiment.

A fifth exemplary embodiment will be described. FIG. 11 is a block diagram illustrating a hardware configuration example according to the present exemplary embodiment. In the following description, differences from the first exemplary embodiment will be described.

In FIG. 11, an abnormality determination unit 1110 is added. In this configuration, the abnormality determination unit 1110 identifies an abnormal value from 16 counted values acquired from the pixel block portion 130.

The pixel whose value is identified as an abnormal value is determined to be a defective pixel (abnormal pixel), and the sensor characteristic (input signal indicating the presence/absence of a defective pixel) are input to the PCLK control unit 380 as described in the fourth exemplary embodiment. In FIG. 11, the abnormality determination unit 1110 is provided in the photoelectric conversion device 10; however, the configuration is not limited thereto, and the abnormality determination unit 1110 can be provided outside the photoelectric conversion device 10. The determination result of a defective pixel can be permanently held in a nonvolatile memory. The determination result of a defective pixel can be reset, the presence/absence of a defective pixel can be detected again, and the determination result of the defective pixel can be held.

Figure 12:
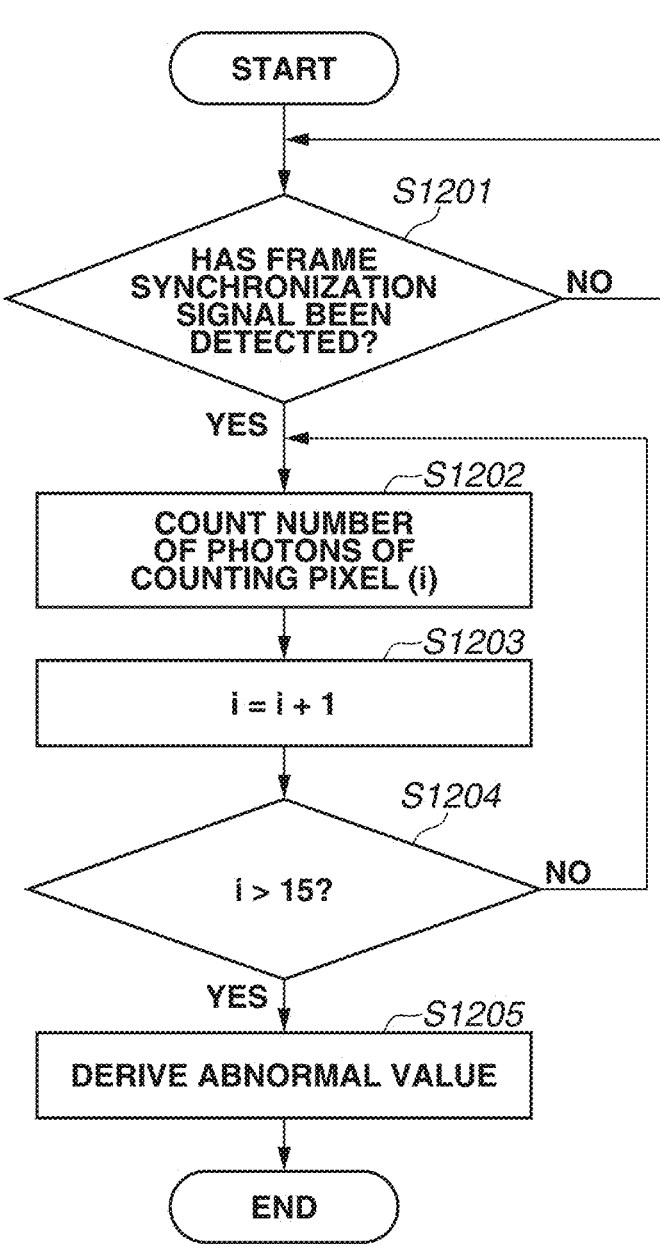
FIG. 12 is a flowchart illustrating the flow of processing according to the fifth exemplary embodiment.

FIG. 12 is a flowchart illustrating the flow of processing according to the present exemplary embodiment. In step S1201, the frame synchronization signal detection processing is performed. If a frame synchronization signal is detected (YES in step S1201), the number of photons in one counting pixel is counted in step S1202. In step S1203, the next pixel P is selected. If the number of photons is counted in all the counting pixels in step S1204 (YES in step S1204), the processing proceeds to step S1205. In the present exemplary embodiment, one pixel block portion 130 includes 16 pixels P, so that the processing in steps S1202 to S1204 is repeated 16 times. The number of photons is counted in all of the 16 pixels P(x, y) in the pixel block portion 130, and 16 counted values and 16 pieces of positional information are stored in a memory or the like (not illustrated).

In step S1205, the determination processing is performed on the 16 counted values to derive an abnormal value. An abnormal value can be derived using a well-known method. For example, with an average value calculated, a value greater by a predetermined value than the average value can be selected as an abnormal value, or with a singular value derived from a histogram that is created, an abnormal value can be selected from the singular value, or other method can be used.

A sixth exemplary embodiment will be described. The sixth exemplary embodiment is applicable to any of the first to fifth exemplary embodiments. FIG. 13A is a schematic diagram illustrating an apparatus 9191 including a semiconductor device 930 according to the present exemplary embodiment. The photoelectric conversion device (imaging device) according to any of the above-described exemplary embodiments can be used for the semiconductor device 930.

The apparatus 9191 including the semiconductor device 930 will be described in detail. As described above, the semiconductor device 930 can include, in addition to a semiconductor device 910 including a semiconductor layer 902, a package 920 housing the semiconductor device 910. The package 920 can include a base to which the semiconductor device 910 is fixed, and a lid, such as glass facing the semiconductor device 910. The package 920 can further include a joining member, such as a bonding wire and a bump, for connecting a terminal provided on the base and a terminal provided on the semiconductor device 910.

The apparatus 9191 can include at least an optical device 940, a control device 950, a processing device 960, a display device 970, a storage device 980, or a mechanical device 990. The optical device 940 is used for the semiconductor device 930. The optical device 940 is, for example, a lens, a shutter, or a mirror, and includes an optical system guiding light to the semiconductor device 930. The control device 950 controls the semiconductor device 930. The control device 950 is a semiconductor device, such as an application specific integrated circuit (ASIC).

The processing device 960 processes a signal output from the semiconductor device 930. The processing device 960 is a semiconductor device, such as a central processing unit (CPU) and an ASIC, for forming an analog front end (AFE) or a digital front end (DFE). The display device 970 is an electroluminescent (EL) display device or a liquid crystal display device displaying information (image) acquired by the semiconductor device 930. The storage device 980 is a magnetic device or a semiconductor device storing the information (image) acquired by the semiconductor device 930. The storage device 980 is a volatile memory, such as a static random access memory (SRAM) and a dynamic random access memory (DRAM), or a nonvolatile memory, such as a flash memory and a hard disk drive.

The mechanical device 990 includes a drive unit or a propulsion unit, such as a motor and an engine. In the apparatus 9191, a signal output from the semiconductor device 930 is displayed on the display device 970, and is transmitted to the outside by a communication device (not illustrated) included in the apparatus 9191. To do so, in one embodiment, the apparatus 9191 further includes the storage device 980 and the processing device 960 separately from a storage circuit and an arithmetic circuit included in the semiconductor device 930. The mechanical device 990 can be controlled based on a signal output from the semiconductor device 930.

The apparatus 9191 is suitable for an electronic apparatus, such as an information terminal including an imaging function (e.g., smartphone and wearable terminal), and a camera (e.g., lens-interchangeable camera, compact camera, video camera, and monitoring camera). The mechanical device 990 in the camera can drive parts of the optical device 940 for a zoom, a focus, and a shutter operation. Other than that, the mechanical device 990 in the camera can move the semiconductor device 930 for an anti-vibration operation.

The apparatus 9191 can be a transport apparatus, such as a vehicle, a vessel, and a flight vehicle (e.g., drone and aircraft). The mechanical device 990 in the transport apparatus can be used as a moving device. The apparatus 9191 as a transport apparatus is suitable for an apparatus transporting the semiconductor device 930, or an apparatus assisting and/or automating driving (operation) by an imaging function. The processing device 960 for assisting and/or automating driving (operation) can perform processing for operating the mechanical device 990 as the moving device based on information acquired by the semiconductor device 930. Besides, the apparatus 9191 can be a medical apparatus, such as an endoscope, a measurement apparatus, such as a ranging sensor, an analytical apparatus, such as an electronic microscope, an office apparatus, such as a copier, and an industrial apparatus, such as a robot.

According to the above-described exemplary embodiment, it is possible to provide excellent pixel characteristics. This can enhance the value of the semiconductor device. The enhancement of the value used herein means at least addition of functions, improvement in performance, improvement in characteristics, improvement in reliability, improvement in manufacturing yield, reduction of an environmental load, cost reduction, downsizing, and weight reduction.

Thus, the semiconductor device 930 according to the present exemplary embodiment used for the apparatus 9191 can improve the value of the apparatus. For example, a transport apparatus provided with the semiconductor device 930 can have excellent performance in imaging outside and measurement of an outside environment. In manufacture and sale of a transport apparatus, the determination to mount the semiconductor device according to the present exemplary embodiment on the transport apparatus is advantageous in enhancing performance of the transport apparatus itself. In particular, the semiconductor device 930 is suitable for the transport apparatus that performs driving assistance and/or automated driving by using information acquired by the semiconductor device.

A photoelectric conversion system and a moving body according to the present exemplary embodiment will be described with reference to FIG. 13B and FIG. 13C.

FIG. 13B illustrates an example of a photoelectric conversion system relating to an on-vehicle camera. A photoelectric conversion system 8000 includes a photoelectric conversion device 80. The photoelectric conversion device 80 is the photoelectric conversion device (imaging device) according to any of the above-described exemplary embodiments. The photoelectric conversion system 8000 includes an image processing unit 801 that performs the image processing on a plurality of pieces of image data acquired by the photoelectric conversion device 80, and a parallax acquisition unit 802 that calculates a parallax (phase difference of parallax images) from a plurality of pieces of image data acquired by the photoelectric conversion system 8000.

The photoelectric conversion system 8000 can include an optical system (not illustrated) guiding light to the photoelectric conversion device 80, such as a lens, a shutter, and a mirror. The pixels included in the photoelectric conversion device 80 can include a plurality of photoelectric conversion units substantially conjugate with a pupil of the optical system. For example, the plurality of photoelectric conversion units substantially conjugate with the pupil is arranged in one microlens. The plurality of photoelectric conversion units receives light fluxes having passed through positions different from each other of the pupil of the optical system, and the photoelectric conversion device 80 outputs image data corresponding to the light fluxes having passed through the different positions. Further, the parallax acquisition unit 802 can calculate the parallax by using the output image data.

The photoelectric conversion system 8000 further includes a distance acquisition unit 803 that calculates the distance to an object based on the calculated parallax, and a collision determination unit 804 that determines whether there is a collision possibility based on the calculated distance. The parallax acquisition unit 802 and the distance acquisition unit 803 are examples of a distance information acquisition unit acquiring distance information to an object. In other words, distance information is information relating to a parallax, the amount of defocus, the distance to an object, and others. The collision determination unit 804 may determine the collision possibility by using any piece(s) of the distance information. The distance information can be acquired by time of flight (ToF).

The distance information acquisition unit can be realized as hardware designed dedicatedly, or a software module. Further, the distance information acquisition unit cab be realized as a field programmable gate array (FPGA), an ASIC, or a combination thereof.

The photoelectric conversion system 8000 is connected to a vehicle information acquisition device 810, and can acquire vehicle information, such as a vehicle speed, a yaw rate, and a steering angle. The photoelectric conversion system 8000 is also connected to a control electronic control unit (ECU) 820 that is a control device outputting a control signal for generating a braking force to the vehicle based on a determination result of the collision determination unit 804. The photoelectric conversion system 8000 is also connected to a warning device 830 that issues a warning to the driver based on a determination result of the collision determination unit 804.

For example, with a high collision possibility as a determination result of the collision determination unit 804, the control ECU 820 performs a vehicle control for avoiding collision or reducing damage by, for example, applying brakes, releasing the accelerator, and reducing the engine output. The warning device 830 issues a warning to the user by, for example, sounding an alert, such as a sound, displaying warning information on a screen of the car navigation system or another screen, and applying a vibration to the seatbelt and the steering wheel.

In the present exemplary embodiment, the surroundings of the vehicle, for example, a view in front of or behind the car is imaged by the photoelectric conversion system 8000. FIG. 13C illustrates the photoelectric conversion system 8000 for imaging a view in front of the vehicle (imaging range 850). The vehicle information acquisition device 810 transmits instructions to the photoelectric conversion system 8000 or the photoelectric conversion device 80. Such a configuration makes it possible to further improve the accuracy of ranging.

The example for controlling a vehicle to avoid collision with another vehicle is described above; however, the present exemplary embodiment can be applied to the control of automatic driving by following another vehicle, the control of automatic driving to avoid going out of a lane, or other controls. Further, the photoelectric conversion system 8000 can be applied to, for example, a moving body (moving device), such as a vessel, an aircraft, and an industrial robot, not limited to a vehicle, such as an automobile. The moving body include a driving force generation unit generating a driving force mainly used to move the moving body and/or a rotating body mainly used to move the moving body. The driving force generation unit can be, for example, an engine or a motor. The rotating body can be, for example, a tire, a wheel, a screw of a vessel, or a propeller of a flight vehicle. In addition, the photoelectric conversion system 8000 can be applied to an apparatus that widely uses object recognition, such as an intelligent transportation system (ITS), not limited to the moving body.

In the present specification, phrases such as "A or B", "at least one of A and B", "at least one of A or/and B", and "one or more of A or/and B" include all the possible combinations of listed items unless otherwise explicitly defined. In other words, it is understood that the above-described phrases disclose a case where at least one A is included, a case where at least one B is included, and a case where at least one A and at least one B are included. This is similarly applied to combinations of three or more elements.

Other Exemplary Embodiments

The above-described exemplary embodiments are merely examples for implementing the present disclosure, and the technical scope of the present disclosure is not limitedly interpreted with the above-described exemplary embodiments. In other words, the present disclosure can be implemented in various forms without departing from the technical idea or main features of the present disclosure. For example, any combination of the elements of the above-described exemplary embodiments is within the scope of the present disclosure.

The above-described exemplary embodiments can be appropriately changed without departing from the technical idea. The disclosed contents of the present specification include not only the contents described in the present specification, but also all contents understandable from the present specification and the drawings attached to the present specification.

According to at least one of the exemplary embodiments of the present disclosure, the photoelectric conversion device with an improved controllability of an event detection is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-135474, filed Aug. 23, 2023, which is hereby incorporated by reference herein in its entirety.

What is claimed is:

1. A photoelectric conversion device comprising:

a pixel array including at least one pixel region for which a common exposure time is set, the at least one pixel region including a plurality of counting pixels each configured to output a pixel signal corresponding to a counted value of a number of photons incident during a given exposure time; and a control unit configured to control the common exposure time of the pixel array, wherein the at least one pixel region includes at least one detection unit configured to detect an event indicating a change in the pixel signals, and a selection unit configured to select one of the plurality of counting pixels included in the at least one pixel region as at least one first counting pixel connected to the at least one detection unit, wherein, in a case where the event is detected, the control unit determines a length of the common exposure time of the at least one pixel region, wherein the at least one pixel region further includes a setting unit configured to set a condition under which imaging is performed by the photoelectric conversion device, wherein the control unit determines the length of the common exposure time of the at least one pixel region based on the event and the condition, and wherein the setting unit derives, as the condition, an optical flow in the at least one pixel region based on the event.

2. The photoelectric conversion device according to claim 1, wherein, in the case where the event is detected, the control unit determines the length of the common exposure time of the at least one pixel region including the at least one first counting pixel.

3. The photoelectric conversion device according to claim 1, wherein, in the case where the event is detected, the control unit determines a length of an exposure time of a pixel region different from the at least one pixel region including the at least one first counting pixel.

4. The photoelectric conversion device according to claim 3, wherein the different pixel region is a pixel region adjacent to the at least one pixel region including the at least one first counting pixel.

5. The photoelectric conversion device according to claim 1, wherein the at least one detection unit comprises a plurality of detection elements, wherein the at least one pixel region includes the plurality of detection elements, wherein the at least one first counting pixel comprises a plurality of first counting pixels, wherein the selection unit connects each of a plurality of first counting pixels selected from the plurality of counting pixels and a corresponding detection unit of the plurality of detection units, and wherein the control unit determines the length of the common exposure time of the at least one pixel region based on the detected events.

6. The photoelectric conversion device according to claim 1, further comprising a storage unit configured to store information on the plurality of counting pixels, wherein the control unit determines the length of the common exposure time of the at least one pixel region based on the event and the information.

7. The photoelectric conversion device according to claim 6, wherein the information is information indicating an abnormality of each of the plurality of counting pixels.

8. The photoelectric conversion device according to claim 7, further comprising a determination unit configured to determine an abnormality of each of the plurality of counting pixels, wherein the determination unit determines the abnormality based on the pixel signals of the counting pixels included in the pixel region.

9. An apparatus including the photoelectric conversion device according to claim 1, further comprising at least any of:

an optical device used for the photoelectric conversion device;

a control device configured to control the photoelectric conversion device;

a processing device configured to process a signal output from the photoelectric conversion device;

a display device configured to display information acquired by the photoelectric conversion device;

a storage device configured to store the information acquired by the photoelectric conversion device; and a mechanical device configured to operate based on the information acquired by the photoelectric conversion device.

10. A photoelectric conversion comprising:

a pixel array including at least one pixel region for which a common exposure time is set, the at least one pixel region including a plurality of counting pixels each configured to output a pixel signal corresponding to a counted value of a number of photons incident during a given exposure time; and a control unit configured to control the common exposure time of the pixel array, wherein the at least one pixel region includes at least one detection unit configured to detect an event indicating a change in the pixel signals, and a selection unit configured to select one of the plurality of counting pixels included in the at least one pixel region as at least one first counting pixel connected to the at least one detection unit, wherein, in a case where the event is detected, the control unit determines a length of the common exposure time of the at least one pixel region, wherein the at least one pixel region further includes a setting unit configured to set a condition under which imaging is performed by the photoelectric conversion device, wherein the control unit determines the length of the common exposure time of the at least one pixel region based on the event and the condition, and wherein the setting unit sets, as the condition, whether a light source is included in an object.

* * * * *